United States Patent Office 3,291,623
Patented Dec. 13, 1966

3,291,623
REFRACTORY BODY AND METHOD OF
MAKING SAME
Alfred C. Saunders, Hamburg, and John F. Grant, Orchard Park, N.Y., assignors to Electro Refractories & Abrasives Corporation, Buffalo, N.Y.
Filed Apr. 29, 1965, Ser. No. 451,936
5 Claims. (Cl. 106—56)

This application is a continuation-in-part of our application Serial No. 191,278, filed April 30, 1962, now abandoned.

Our invention relates to a series of improved refractory bodies consisting of various granular refractory materials together with a bond of silicon nitride plus carbon. These refractories are substantially completely infusible, are extremely hard and strong and resist wetting by molten metals to a marked degree. They are moreover resistant to reaction with combustion gases even at very high temperatures and certain of them are of such low density as to be particularly indicated for such air borne uses as rocket liners and combustion chambers.

In the manufacture of these refractories, we admix the primary refractory materials such as silicon carbide, fused alumina, zircon, mullite, periclase, etc., in granular form with finely powdered silicon metal or a high silicon alloy and a carbon-forming binder such as tar or pitch in such form and percentage as to hold the mass together when compacted into desired shapes as will be illustrated in various examples below. Synthetic resins which carbonize on heating may also be used in whole or in part as the original binder.

The formed pieces after compacting the mix in suitable molds are completely supported for firing by burying them in crushed carbon, flake graphite or even in sand. In any event they are held rigidly in place, shape, and size while the volatiles in the tar or pitch are driven off as the furnace temperature rises. This leaves the refractory granules and the silicon powder held in a rigid but porous carbon mass where in the next step of the process the silicon is converted to $Si_3N_4$ by contact with hot nitrogen from the surrounding furnace gases.

In order to accomplish this we interpose between the buried pieces and the surrounding furnace atmosphere a layer of permeable carbon or graphite granules held in a suitable refractory container such as a loosely covered box or sagger into which the furnace gases can readily permeate, as the furnace is heated to 2100° F. or higher. In this way any oxygen or $CO_2$ in the furnace gases is converted to CO on its way through the permeable carbon layer leaving the nitrogeneous portion of the gases unchanged at that stage. The silicon powder however has a strong affinity for nitrogen at temperatures such as 2200° F., reacting with it to form $Si_3N_4$ which is a solid. The gaseous nitrogen is thus continuously used up and still more is drawn in through the carbon until the Si has all been converted to nitride (or under certain conditions to beta SiC). The pores adjacent the Si are partially filled with the newly formed nitride so that the body becomes hard, strong, considerably denser and relatively impermeable when the attractive power of the Si for $N_2$ has been used up.

The silicon nitride so formed reinforces the previously relatively weak carbon bond, each portion appearing to protect the other from attack by ambient gases and making the body as a whole infusible at temperatures over 3000° F.

We find that it is important to allow sufficient time during firing in the temperature range from 2100° F. to about 2400° F. for the silicon to be completely converted to nitride. In our firing we therefore hold the temperature in this range for at least 12 hours before raising it higher though we find it desirable to finish our firing at a higher temperature such as 2600° to 2900° F. as the strength of the bodies is thereby increased and the likelihood of any free silicon remaining in the body greatly diminished. At temperatures below about 2100° F. the nitride formation is very slight and at temperatures above about 2600° F., any unconverted free Si tends to react with the bond carbon rather than waiting for nitrogen. The presence of a minor amount of beta SiC formed in this way after the nitride bond is formed is preferable to having unreacted Si in the body, hence we try to convert our Si as completely as possible to the nitride in the 21–2400° F. range and then finishing with a final hotter burn to 2700–2900° F. to use up any remaining free silicon metal.

After the body has been thus fired, it is unburied and can be thereafter reheated without further change save that when the heating is in a strongly oxidizing atmosphere, the silicon containing ingredients (nitride, carbide or oxide if present) form thin protective films of silica within the very fine pores of the body and plug them so tightly that oxidation of the body proceeds very slowly.

While the composition of bodies within the scope of our invention can be varied over a considerable range, the important factor is that there should always be a bond of porous carbon tightly adhering to the refractory granules with silicon nitride formed in the pores thereof with a minimum of either uncombined silicon or freshly formed beta silicon carbide in the body. To attain the desired state both the amount of pore forming bond and the amount of fine silicon initially present must be carefully controlled both in absolute amount and in proportion to one another.

We attempt at the outset, during the mixing and forming of our bodies, to thoroughly coat and wet the surfaces of our main refractory granules with a carbonaceous material which will adhere tightly to them even after carbonization and which upon heating will carbonize with evolution of gas, leaving the adhering carbon in a highly porous state. Unless the silicon is first taken up by reaction with the nitrogen it is quite reactive at high temperatures such as 2600° F. or more with the freshly liberated carbon, forming beta silicon carbide with a change in volume which is usually undesirable.

We find that in general at least 2% of porous carbon bond is desirable (representing approximately 5% of tar or pitch for example in the mix) or the resistance of the body to thermal shock is lowered and the strength is less than when more carbon is used and the piece is also more susceptible to reaction with molten aluminum or other metals. On the other hand, where the proportion of porous carbon exceeds 6–8% before nitriding, the final product is so porous as to be objectionably weak and subject to oxidation damage. An amount of 2 to 5% porous carbon bond in our final nitrided body appears to give most satisfactory results in terms of spall resistance, strength and chemical inertness in bodies falling within the scope of our claims.

Tar and pitches yielding 35 to 50% of their weight as carbon after carbonization or synthetic resins such as Durez Plastics Co.'s Durex No. 14383 (a furfuryl alcohol resin) are satisfactory bonds for use in our mixes. Phenolic or urea resins also make satisfactory bonds. From 5 to about 18% of such binders in the original mix is recommended depending on the proportion of porous carbon desired in the final body.

We find the proportion of silicon powder (normally thru 100 mesh) in our bodies also has a distinctly optimum range. When a porous carbon binder of our type is used, we find that the strength of the body is too low for dependable use unless at least 2% Si is included. As the silicon is increased beyond this point the strength increases materially as illustrated in FIG. 1 for bodies of the type of Example 1 below but the maximum desirable amount is limited for reasons set forth below.

We find that as the proportion of porous carbon increases it becomes increasingly important that the percentage of silicon used should not be too high regardless of the nature of the refractory granules used, or it may give trouble in either of two ways:

(a) The development of $Si_3N_4$ in the outer layers of the body tends to prevent penetration of the nitrogen gas to the interior of the piece resulting in a cored body of non-homogeneous structure with a serious tendency to rupture on repeated heating and cooling in use. Here also due to the presence of uncombined silicon in the inside of the body the resistance of the finished body to reaction and attack by molten metals such as aluminum is diminished because the uncombined silicon on the interior of the body tends to permeate to the surface where it attracts wetting and reaction with the metal.

(b) When the accessibility of the Si to react with nitrogen is thus interfered with, a second difficulty also arises in that at temperatures above about 2600° F. before adequate nitrogen can get to the free Si, this tends to react with the free carbon in the body before sufficient nitride is formed, thus destroying the desired porous carbon bond and forming beta SiC with disruption of the body.

When the bond carbon is in the lower range around 2 to 3%, the initial silicon in the mix may range from 2% up to about 15%, however, when the bond carbon is 5 to 6% we find that the silicon is best limited to a maximum around 10% if the troubles enumerated above are to be avoided.

The importance of the percentage of silicon on the properties of the body is illustrated in the accompanying curves (FIGS. 1 and 2) relative to bodies made with 8.2% of tar (yielding about 3.5% of porous carbon) and otherwise made of 8 mesh and finer SiC grain together with various percentages of 100 mesh and finer silicon powder, molded by pressing into bars and fired to 2200° F. for twelve hours and then to 2750° F. as described in Example 1 cited below.

Modulus of rupture is of course important as indicating strength of the body. It is however disadvantageous to have too rigid a body—i.e., too high a modulus of elasticity. The well known Winkelmann and Schott formula indicates that resistance to heat shock is inversely proportional to the modulus of elasticity and directly proportional to breaking strength. We have therefore set up a factor S to represent resistance to heat shock which is arrived at by dividing the modulus of rupture by the modulus of elasticity. The higher this factor is, the better the body in its resistance to heat shock.

For the bodies here in question these values follow:

| Percent Si | M. of R. | M. of E. ×10⁶ | S |
| --- | --- | --- | --- |
| 2½ | 1,950 | 9.1 | 214 |
| 5 | 2,850 | 10.0 | 285 |
| 7½ | 3,450 | 11.5 | 300 |
| 10 | 3,500 | 12.5 | 280 |
| 12½ | 3,350 | 13.5 | 248 |
| 15 | 3,000 | 13.8 | 219 |
| 17½ | 2,650 | 13.9 | 191 |
| 20 | 2,350 | 13.4 | 175 |

Figure 1:
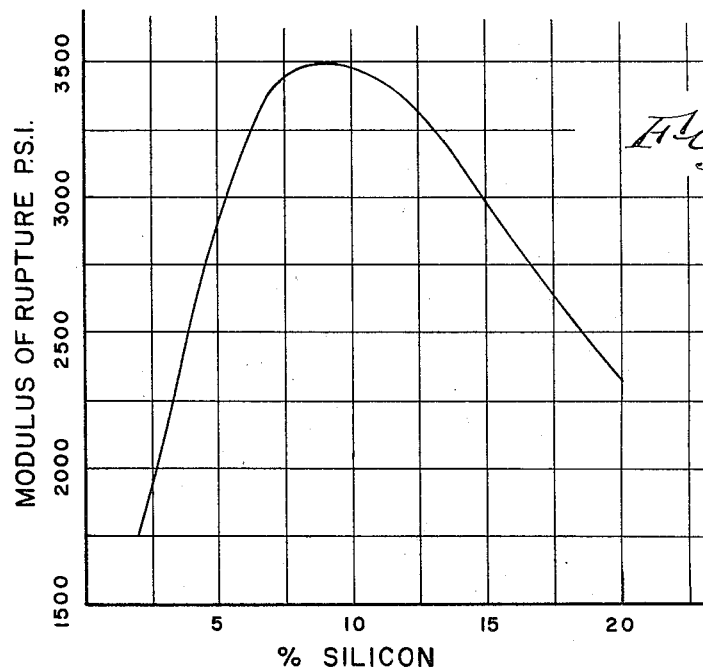
FIG. 1 shows modulus of rupture of the various bars made from these mixes.
Figure 2:
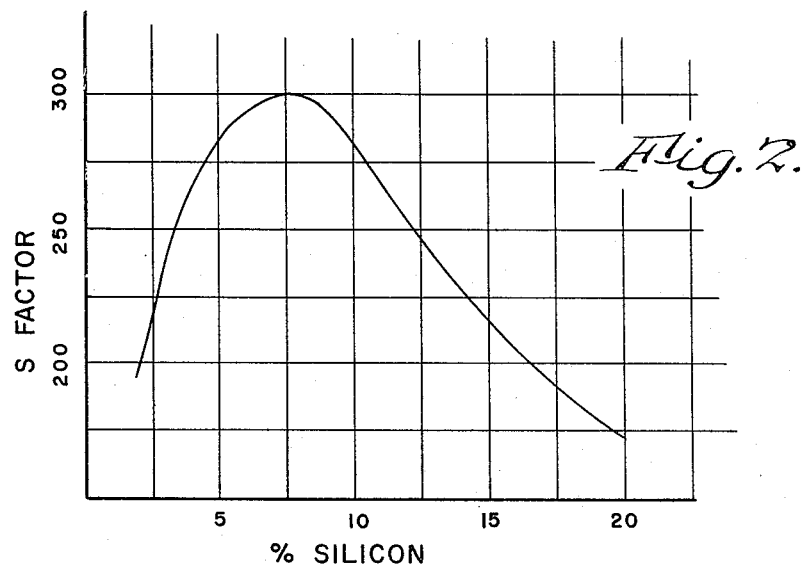
FIG. 2 shows modulus of rupture divided by modulus of elasticity of the same bars.

These values have been plotted to yield the curves of FIGS. 1 and 2. Examination of these curves indicates that for this particular series of bodies optimum values of both modulus of rupture and spall resistance occur with between about 5 and 15% of silicon although serviceable bodies result with as little as 2%. Above 15%, these values are adequate but as pointed out above our experience shows that conversion of the silicon to nitride becomes incomplete resulting in an objectionable susceptibility of the body to attack by molten aluminum and other bad effects.

While bodies with different amounts of carbon and different other ingredients result in different strengths and other characteristics, our experience indicates that within our claimed range all show optimum values over approximately the same range of silicon contents, being too weak and too susceptible to heat shock with less than 2% Si and too susceptible to heat shock and metal attack with much over 15% of silicon in the original mix. This proportion (2 to 15%) of silicon in the original mix, we find results in from 3 to 20% silicon nitride in the final body when fired as herein directed.

It should be pointed out that firing temperatures are somewhat critical. Below about 2000° F., there appears to be little or no formation of silicon nitride while particularly at temperatures of 2600° F. or more the free silicon combines with the porous carbon forming beta SiC with a tendency to disrupt the body unless adequate nitride bond is formed first at lower temperatures.

We are aware that the prior art includes various bodies made from silicon carbide plus silicon which are fired in an atmosphere of nitrogen gas from various sources. These bodies however differ from ours in that they do not comprise a substantial matrix bond of uncombined carbon in porous form in the pores of which the silicon nitride is held. Our experience shows these other refractories to be inferior to ours in resistance to erosion by molten metals such as aluminum and also in resistance to breakage by thermal shock. Due to the porous nature of our bodies, certain of them particularly those made with silicon carbide are moreover so light as to be of value in air borne applications, which is not true of the non-carbon bonded materials. Our tests show further that as explained above when an excessive amount of silicon in proportion to the carbon present is used, in our porous carbon bonded type body, the conversion of the silicon to nitride is incomplete and much of the silicon reacts with the free carbon present at temperatures of 2300° F. or higher, destroying a part of the desired porous carbon bond and forming beta SiC instead. This involves a substantial local increase in volume and tends to physically disrupt the body during firing. Even if the body is not so disupted, its coefficients of thermal expansion and elasticity are so increased as to detrimentally affect its utility for many purposes.

As examples of specific bodies made in accord with our invention, we cite below two examples. These are for purpose of illustration and not limitation. The important factors are that a carbonizable binder be used to give a porous carbon bond within the ranges claimed and that silicon be present within the ranges discussed above. Otherwise the refractory materials enumerated in our second paragraph may be used separately or admixed in any desired proportions to yield bodies of desired physical and chemical characteristics.

The following Example 1 illustrates bodies closely approximating those for which physical data are quoted above.

*Example 1*

We have made a mixture of the following composition:

78.5% 8 mesh and finer SiC grain
12% 100 mesh and finer Si
9% tar plus 1% pitch, yielding 4% C This was mixed, molded and fired to 2200° F. for twelve hours in a gas fired furnace while buried in 8 mesh and finer graphite flakes which covered the pieces two inches deep after which they were fired briefly to 2750° F. and then cooled in the furnace until they could be comfortably handled. Extremely strong dense refractory pieces were thus produced on which the analysis was approximately

| | Percent |
|---|---|
| SiC | 85 |
| $Si_3N_4$ | 11 |
| C | 2 |
| $Al_2O_3$ | 0.5 |

Their density was 2.47 and cold modulus of rupture from 3500 to 6000 p.s.i. There seems to be relatively little tendency in this material to form beta SiC and the final firing may advantageously go somewhat higher, say to 2900° F.

*Example 2*

A mix was made using:

75% fused mullite grain, 8 mesh and finer
15% 100 mesh and finer Si
10% tar, yielding 4% C This material was mixed, molded and fired as in the other example. Density of the fired pieces was 2.35 and their cold modulus of rupture from 2400 to 4000 p.s.i. Upon analysis they were found to consist of about 20% $Si_3N_4$ and 3% of free carbon which constituents served to bond the mullite granules which remained unchanged.

While the mullite of Example 2 was of the electrically fused variety consisting of about 80% $Al_2O_3$ plus 20% $SiO_2$ which on fusion yields predominantly crystals of mullite ($3Al_2O_3 \cdot 2SiO_2$) in a silica glass, the type of mullite formed by calcination of kyanite which is similar in nature though with much higher glass content could obviously be used in the same way.

In all of our bodies, the bond seems to be a mixture of porous carbon derived from the tar, pitch, or resin with finely divided silicon nitride dispersed throughout the carbon. In some cases, particularly when firing has been as hot as 2800° F. there is also present some newly formed beta SiC and somewhat less nitride, although the nature of the bond still seems to be the same. It is particularly important in such bodies that a substantial amount of silicon nitride be formed before the carbide reaction occurs.

Other granular refractory materials such as fused alumina, zircon, etc., may be substituted for the mullite of Example 3 and similarly processed, or these materials may be admixed in various proportions with either silicon carbide or graphite. By using the alumina in the form of hollow bubbles, a particularly light refractory is obtained.

When the mixtures include substantial amounts of graphite, somewhat different conditions enter and these bodies are the subject of a separate co-pending application Serial No. 452,024, filed April 29, 1965.

We find that the refractories of the present application are extremely resistant to heat shock, probably, partly because of their excellent strength and partly because the peculiar nature of the bond imparts a relatively low coefficient of thermal expansion which we find to be in general approximately half to two-thirds the coefficient of the same refractory granules bonded with ordinary ceramic bonds. As noted above, we also find our refractories are almost completely resistant to wetting by molten metals of the non-ferrous types or by cast iron and are therefore not damaged by contact with such melts and so make excellent crucibles in which to contain them. The resistance of our refractories to oxidation is good to excellent at all temperatures so that in general it is unnecessary to coat them with a protective coat of glaze.

In most cases, we fire our bodies in a fuel fired furnace where the nitrogen to form nitride comes from the air used for combustion. It is obvious however that nitrogen gas from any source such as bottle gas or ammonia may also be used and the temperature raised to the desired values by any suitable method of heating compatible therewith.

Having thus described our invention and shown examples of its application, we claim:

1. A refractory body composed of granules of at least one refractory material selected from the group consisting of silicon carbide, mullite, aluminum oxide, zircon, and periclase bonded with a mixture of 2 to 5% porous carbon and 3 to 20% finely divided silicon nitride dispersed through said carbon.

2. The method of making a refractory which consists of admixing solid granules of at least one refractory material from the group consisting of silicon carbide, mullite, aluminum oxide, zircon and periclase with approximately 5 to 18% of a carbonizable hydrocarbon and 2 to 15% of powdered silicon, forming the mixture into a desired shape, supporting said shape in surrounding refractory granules to prevent its slumping and firing it in an atmosphere high in nitrogen at a temperature within the range from 2100 to 2400° F. to substantially completely convert the silicon to nitride.

3. A refractory body composed of refractory granules consisting predominantly of silicon carbide bonded with a mixture of 2 to 5% of porous carbon with 3 to 20% of finely divided silicon nitride dispersed throughout said carbon.

4. A refractory body composed of refractory granules consisting predominantly of mullite bonded with a mixture of 2 to 5% of porous carbon with 3 to 20% of finely divided silicon nitride dispersed throughout said carbon.

5. A refractory body composed of refractory granules of hollow bubbles of alumina bonded with a mixture of 2 to 5% porous carbon and 3 to 20% of finely divided silicon nitride dispersed throughout said carbon.

References Cited by the Examiner

UNITED STATES PATENTS

| 866,444 | 9/1907 | Egly | 106—44 |
|---|---|---|---|
| 1,483,507 | 2/1924 | Brockbank | 106—44 |

TOBIAS E. LEVOW, *Primary Examiner.*

J. E. POER, *Assistant Examiner.*